US008994590B2

(12) United States Patent
Jarvis et al.

(10) Patent No.: US 8,994,590 B2
(45) Date of Patent: Mar. 31, 2015

(54) WI-FI POSITION FIX

(75) Inventors: Murray Jarvis, Cambridge (GB); Ben Tarlow, Cottenham (GB)

(73) Assignee: Cambridge Silicon Radio Limited, Cambridge (GB)

( * ) Notice: Subject to any disclaimer, the term of this patent is extended or adjusted under 35 U.S.C. 154(b) by 734 days.

(21) Appl. No.: 13/249,948

(22) Filed: Sep. 30, 2011

(65) Prior Publication Data

US 2013/0082878 A1    Apr. 4, 2013

(51) Int. Cl.
  *G01S 5/14*    (2006.01)
  *G01S 5/02*    (2010.01)
(52) U.S. Cl.
  CPC ............. *G01S 5/0278* (2013.01); *G01S 5/14* (2013.01); *G01S 5/02* (2013.01)
  USPC .......................................... 342/451; 342/463
(58) Field of Classification Search
  CPC .................................................. G01S 5/0278
  USPC .................................................. 342/451, 464
  See application file for complete search history.

(56) References Cited

U.S. PATENT DOCUMENTS

| 5,045,860 | A * | 9/1991 | Hodson ........................ 342/451 |
| 8,149,162 | B1 * | 4/2012 | Pauls ........................... 342/351 |
| 2012/0028652 | A1 * | 2/2012 | Wirola et al. ............. 455/456.1 |

FOREIGN PATENT DOCUMENTS

| WO | 2007/001660 A2 | 1/2007 |
| WO | 2010/125113 A1 | 11/2010 |

OTHER PUBLICATIONS

Evans, Jeremy. "Error Analysis and Least Squares CPSD #G100398", The Office of Land Surveys, 2001, pp. 1-119.(http://www.dot.ca.gov/hq/row/landsurveys/Study_material/Error_Analysis_And_Least_Squares.pdf).*
The extended European Search Report dated Jan. 17, 2013, in corresponding EP patent application.

* cited by examiner

*Primary Examiner* — Gregory C Issing
(74) *Attorney, Agent, or Firm* — RatnerPrestia

(57) ABSTRACT

A method of forming an estimate of the two-dimensional position of a radio receiver relative to a plurality of radio transmitters each having an associated position estimate and a position uncertainty expressible as an uncertainty ellipse having major and minor axes, the method comprising using the uncertainty vectors describing the uncertainty ellipses of the radio transmitters in a predetermined coordinate system to define a new compound coordinate basis, and forming an estimate of the two-dimensional position of the radio receiver in the compound coordinate basis by projecting the major and minor axes of each uncertainty ellipse onto the new compound coordinate basis and calculating the position of the radio receiver by means of a weighted centroid that uses weighting values calculated in the new compound coordinate basis and position estimates of the plurality of the radio transmitters expressed in the compound coordinate basis.

46 Claims, 4 Drawing Sheets

WI-FI POSITION FIX

FIELD OF THE TECHNOLOGY

This disclosure relates to a method of forming an estimate of the two-dimensional position of a radio receiver relative to a plurality of radio transmitters whose locations have an associated uncertainty, and to a method of forming an estimate of the two-dimensional position of a radio transmitter relative to a plurality of radio receivers whose location has an associated uncertainty (or equivalently: relative to a radio receiver provided at a plurality of known locations). The disclosure further provides an estimate of the uncertainty of a position estimated according to such methods.

BACKGROUND

Due to the ubiquity of Wi-Fi access points in buildings and urban areas in general, and the difficulty in obtaining reliable GPS signals in such areas, it is becoming increasingly common for portable devices to be able to determine their position with respect to a set of Wi-Fi access points of known position. For example, many smartphones are provided with access to a database that includes the identifiers and locations of Wi-Fi access points around the globe such that the smartphone can, on detecting one or more Wi-Fi access points, identify the locations of at least one of those access points (APs) and infer its location.

Typically, a portable Wi-Fi device may determine its position r by means of a simple weighted centroid that expresses the position of the device as a linear combination of the known locations $r_i$ of a set of Wi-Fi access points, each weighted by a weight $w_i$ that depends on the signal strength received from the respective access point scaled by its transmit power. This is illustrated in the below equation:

$$r = \frac{\sum_i w_i r_i}{\sum_i w_i} \qquad 1.1$$

However, there can be considerable uncertainty in the locations of the Wi-Fi access points that conventional location determination algorithms do not take account of. This can lead to poor accuracy in the determined position of the device and an unknown uncertainty in the determined position of the device. Furthermore, the uncertainty in the location of an access point can have a significant directionality such that the location uncertainty is greater in one direction than in a perpendicular direction.

The same weighted centroid method of position determination can also be used to estimate the position of a Wi-Fi access point from the known locations of a set of Wi-Fi receivers receiving signals from the access point—or, equivalently, from multiple known locations of a single Wi-Fi receiver. For example, the positions of Wi-Fi access points are often determined through the use of a scanning vehicle fitted with a GPS receiver and a Wi-Fi receiver: as the scanning vehicle travels along a road it listens for Wi-Fi access points and infers the position of each Wi-Fi access point by measuring at multiple locations (as determined by its GPS receiver) the signal strength of signals from that access point. The position r of an access point can be estimated according to equation 1.1, where $r_i$ are the locations at which the Wi-Fi receiver makes a measurement of signal strength and $w_i$ is a weight that depends on the measured signal strength received from the respective access point.

As a result of the uncertainty in the GPS position of the Wi-Fi receiver (e.g. the scanning vehicle) and the uncertainties introduced by the method of position estimation, there can be considerable uncertainty in the estimated position of each access point. Furthermore, due to the fact that a Wi-Fi receiver may measure the signal strength of an access point from a limited number of locations, the uncertainty in the location of an access point can have a significant directionality—for example, a' scanning vehicle might be constrained to move along a road such that the positional error of the access point in a direction perpendicular to the road is much greater than the error in a direction parallel to the road.

There is therefore a need for an improved method of forming an estimate of the position of a radio receiver relative to a set of radio transmitters whose locations have an associated uncertainty, and a need for an improved method of forming an estimate of the position of a radio transmitter relative to a set of radio receivers of known locations or relative to a single receiver present at multiple locations.

SUMMARY OF THE DESCRIPTION

According to a first aspect of the present disclosure there is provided a method of forming an estimate of the two-dimensional position of a radio receiver relative to a plurality of radio transmitters each having an associated position estimate and a position uncertainty expressible as an uncertainty ellipse having major and minor axes, the method comprising: receiving at the radio receiver signals from the plurality of radio transmitters and forming in dependence on those received signals a set of transmitter weighting values each expressing a measure of the distance of a respective radio transmitter from the radio receiver; for each of the plurality of radio transmitters, scaling an uncertainty vector describing the orientation of the respective uncertainty ellipse in a predetermined coordinate system by a scaling value dependent on the respective transmitter weighting value and rotating that uncertainty vector by multiplying its argument by a factor of four; summing the scaled and rotated vectors of the plurality of radio transmitters so as to form a total vector; dividing the argument of the total vector by a factor of four and using the resulting rotated total vector to define a compound coordinate basis comprising first and second coordinate axes; and forming an estimate of the two-dimensional position of the radio receiver in the compound coordinate basis by: projecting the major and minor axes of each uncertainty ellipse onto the first and second coordinate axes so as to form a set of projected components for each axis; summing the projected components of each axis so as to form a total uncertainty along each axis; for each uncertainty ellipse, forming first and second coordinate axis weighting values from the respective transmitter weighting values scaled such that the first/second coordinate axis weighting value decreases as the total uncertainty along that first/second coordinate axis increases; and calculating the position of the radio receiver by means of a weighted centroid using the first and second coordinate axis weighting values and the position estimates of the plurality of the radio transmitters expressed in the compound coordinate basis.

Suitably further comprising transforming the calculated position of the radio receiver into the predetermined coordinate system for use as an estimate of the two-dimensional position of a radio receiver.

Suitably each uncertainty ellipse is represented by information expressing the length of the major and minor axes of the uncertainty ellipse and its orientation according to the predetermined coordinate system.

Suitably the argument of the uncertainty vector describing the orientation of a respective uncertainty ellipse is the angle between a predetermined one of the major and minor axes of that uncertainty ellipse and a predetermined direction defined in the predetermined coordinate system.

Preferably each scaling value used in the step of scaling the uncertainty vectors of the plurality of radio transmitters is further dependent on a measure of the anisotropy of the respective uncertainty ellipse. Preferably the measure of the anisotropy of each uncertainty ellipse ratio is given by a ratio of the major axis length to the minor axis length of the respective uncertainty ellipse.

Preferably each scaling value is further dependent on a measure of the length of the minor axis of the respective uncertainty ellipse relative to the first predetermined length such that each scaling value varies from zero when the length of the respective minor axis is equal to the first predetermined length up to a maximum when the length of the respective minor axis is zero.

Preferably the step of forming each first and second coordinate axis weighting value from the transmitter weighting values is performed such that each first/second coordinate axis weighting value is given by the respective transmitter weighting value scaled by a factor that ranges from a predetermined minimum value when the total uncertainty along that first/second coordinate axis is at least a second predetermined length up to a maximum when the total uncertainty along that first/second coordinate axis is zero.

Suitably the first and second predetermined lengths are approximately 60 meters. Suitably the predetermined minimum value is ⅛.

Suitably each uncertainty ellipse is defined with respect to the predetermined coordinate system.

Preferably the first coordinate axis is represented by a normalized vector coincident with the rotated total vector and the second coordinate axis is represented by a normalized vector non-coincident with the rotated total vector. Preferably the first and second coordinate axes are defined so as to form an orthogonal basis set.

Suitably the radio receiver is configured to receive the position estimate and position uncertainty of each of the plurality of radio transmitters by means of one or more of: radio signals transmitted from one or more of the plurality of radio transmitters; a database stored at the radio receiver; and a database remotely accessible to the radio receiver.

Preferably each uncertainty vector describing the orientation of a respective uncertainty ellipse is a unit vector defining the direction of the major or minor axis of that uncertainty ellipse in the predetermined coordinate system.

Suitably the predetermined coordinate system is one in which two-dimensional positions are expressed with respect to magnetic north or a geodetic coordinate system.

Preferably each transmitter weighting value is formed in dependence on the signal strength of the signals received from the respective radio transmitter, a transmitter weighting value being greater for a greater received signal strength. Preferably each transmitter weighting value is scaled in dependence on the power of the respective radio transmitter such that the transmitter weighting values are approximately independent of transmitter power, the transmitter power of each radio transmitter being signaled to the radio receiver by the respective radio transmitter.

Preferably the step of summing the projected components of each axis so as to form a total uncertainty along each axis is performed such that the square of the total first/second axis uncertainty is given by the sum of the squares of the respective projected components.

The method may further comprise, for each of the first and second coordinate axes: calculating a correlated confidence estimate by means of a weighted centroid using the respective coordinate axis weighting values and the projected components of the major and minor axes of each uncertainty ellipse along that respective coordinate axis; calculating an uncorrelated confidence estimate by: forming for each uncertainty ellipse the product of the respective coordinate axis weighting value and the sum of the projected components along the respective coordinate axis of the major and minor axes of that uncertainty ellipse; summing over the set of uncertainty ellipses the squares of those products; and, dividing by the sum over the set of uncertainty ellipses of the squares of the respective coordinate axis weighting values; forming a compound confidence estimate whose square is a weighted combination of the uncorrelated confidence estimate and the square of the correlated confidence estimate; and using the compound confidence estimate as an estimate of the uncertainty of the position of the radio receiver due to the uncertainty in the position estimates of the plurality of radio transmitters.

The method may further comprise: forming an estimate of a weighting uncertainty in the position of the radio receiver due to the mechanism by which the transmitter weighting values are formed and optionally systematic errors due to the position of the radio receiver being calculated by means of a weighted centroid; and combining the compound confidence estimate and the weighting uncertainty in quadrature so as to form an estimate of the total uncertainty in the estimated position of the radio receiver.

Preferably the plurality of radio transmitters are Wi-Fi access points and the radio receiver is a portable Wi-Fi device.

According to a second aspect of the present disclosure there is provided a radio receiver operable to estimate its position relative to a plurality of radio transmitters, the radio receiver having access to information defining, for each radio transmitter, a position estimate and position uncertainty expressible as an uncertainty ellipse having major and minor axes, and the radio receiver comprising: an antenna for receiving signals from the plurality of radio transmitters; a weighting determination unit configured to form in dependence on signals received from the radio transmitters a set of transmitter weighting values each expressing a measure of the distance of a respective radio transmitter from the radio receiver; and a position calculation unit configured to estimate the position of the radio receiver by: for each of the plurality of radio transmitters, scaling an uncertainty vector describing the orientation of the respective uncertainty ellipse in a predetermined coordinate system by a scaling value dependent on the respective transmitter weighting value and rotating that uncertainty vector by multiplying its argument by a factor of four; summing the scaled and rotated vectors of the plurality of radio transmitters so as to form a total vector; dividing the argument of the total vector by a factor of four and using the resulting rotated total vector to define a compound coordinate basis comprising first and second coordinate axes; and forming an estimate of the two-dimensional position of the radio receiver in the compound coordinate basis by: projecting the major and minor axes of each uncertainty ellipse onto the first and second coordinate axes so as to form a set of projected components for each axis; summing the projected components of each axis so as to form a total uncertainty along each axis; for each uncertainty ellipse, forming first and second coordinate axis weighting values from the respective transmitter weighting values scaled such that the first/second coordinate axis weighting value decreases as the total uncertainty along that first/second coordinate axis increases; and calculating the position of the radio receiver by means of a weighted centroid using the first and second coordinate axis weighting values and the position estimates of the plurality of the radio transmitters expressed in the compound coordinate basis.

According to a third aspect of the present disclosure there is provided a method of forming an estimate of the two-dimensional position of a radio transmitter relative to a plurality of radio receiver positions each having a corresponding position uncertainty expressible as an uncertainty ellipse having major and minor axes, the method comprising: receiving at the radio receiver positions signals from the radio transmitter and forming in dependence on those received signals a set of receiver weighting values each expressing a measure of the distance of the radio transmitter from the radio receiver positions; for each of the plurality of radio receiver positions, scaling an uncertainty vector describing the orientation of the respective uncertainty ellipse in a predetermined coordinate system by a scaling value dependent on the respective receiver weighting value and rotating that uncertainty vector by multiplying its argument by a factor of four; summing the scaled vectors of the plurality of radio receiver positions so as to form a total vector; dividing the argument of the total vector by a factor of four and using the resulting rotated total vector to define a compound coordinate basis comprising first and second coordinate axes; and forming an estimate of the two-dimensional position of the radio transmitter in the compound coordinate basis by: projecting the major and minor axes of each uncertainty ellipse onto the first and second coordinate axes so as to form a set of projected components for each axis; summing the projected components of each axis so as to form a total uncertainty along each axis; for each uncertainty ellipse, forming first and second coordinate axis weighting values from the respective transmitter weighting values scaled such that the first/second coordinate axis weighting value decreases as the total uncertainty along that first/second coordinate axis increases; and calculating the position of the radio transmitter by means of a weighted centroid using the first and second coordinate axis weighting values and the radio receiver positions expressed in the compound coordinate basis.

The method may further comprise transforming the calculated position of the radio transmitter into the predetermined coordinate system for use as an estimate of the two-dimensional position of a radio transmitter.

Suitably the argument of the uncertainty vector describing the orientation of a respective uncertainty ellipse is the angle between a predetermined one of the major and minor axes of that uncertainty ellipse and a predetermined direction defined in the predetermined coordinate system.

Suitably each uncertainty ellipse is represented by information expressing the length of the major and minor axes of the uncertainty ellipse and its orientation according to the predetermined coordinate system.

Preferably the steps of the method are performed at a radio receiver arranged to move between the plurality of radio receiver positions so as to receive said signals from the radio transmitter at those radio receiver positions. Preferably the radio receiver is configured to determine its position and its position uncertainty as an uncertainty ellipse having major and minor axes. Preferably the radio receiver is configured to determine its position and its position uncertainty by means of a GPS receiver. Preferably the radio transmitter is a Wi-Fi access point and the radio receiver is a scanning vehicle supporting a Wi-Fi receiver and a GPS receiver.

Alternatively a different radio receiver is provided at each of the radio receiver positions so as to collectively receive said signals from the radio transmitter at those radio receiver positions. Suitably the radio receivers are configured to exchange their respective receiver weighting values so as to allow one or more of the radio receivers to form an estimate of the two-dimensional position of the radio transmitter. Suitably the estimate of the two-dimensional position of the radio transmitter is formed at a calculation server coupled to the plurality of radio receivers and configured to receive their respective receiver weighting values.

Preferably each scaling value used in the step of scaling the uncertainty vectors of the plurality of radio receivers is further dependent on a measure of the anisotropy of the respective uncertainty ellipse.

Preferably each scaling value is further dependent on a measure of the length of the minor axis of the respective uncertainty ellipse relative to the first predetermined length such that each scaling value varies from zero when the length of the respective minor axis is equal to the first predetermined length up to a maximum when the length of the respective minor axis is zero.

Preferably the step of forming each first and second coordinate axis weighting value from the receiver weighting values is performed such that each first/second coordinate axis weighting value is given by the respective receiver weighting value scaled by a factor that ranges from a predetermined minimum value when the total uncertainty along that first/second coordinate axis is at least a second predetermined length up to a maximum when the total uncertainty along that first/second coordinate axis is zero.

Suitably each uncertainty ellipse is defined with respect to the predetermined coordinate system.

Preferably the first coordinate axis is represented by a normalized vector coincident with the rotated total vector and the second coordinate axis is represented by a normalized vector orthogonal to the rotated total vector.

Preferably each uncertainty vector describing the orientation of a respective uncertainty ellipse is a unit vector defining the direction of the major or minor axis of that uncertainty ellipse in the predetermined coordinate system.

Preferably each receiver weighting value is formed in dependence on the signal strength of the signals received at the respective radio receiver position from the radio transmitter, a receiver weighting value being greater for a greater received signal strength.

Preferably the step of summing the projected components of each axis so as to form a total uncertainty along each axis is performed such that the square of the total first/second axis uncertainty is given by the sum of the squares of the respective projected components.

The method may further comprise, for each of the first and second coordinate axes: calculating a correlated confidence estimate by means of a weighted centroid using the respective coordinate axis weighting values and the projected components of the major and minor axes of each uncertainty ellipse along that respective coordinate axis; calculating an uncorrelated confidence estimate by: forming for each uncertainty ellipse the product of the respective coordinate axis weighting value and the sum of the projected components along the respective coordinate axis of the major and minor axes of that uncertainty ellipse; summing over the set of uncertainty ellipses the squares of those products; and, dividing by the sum over the set of uncertainty ellipses of the squares of the respective coordinate axis weighting values; forming a compound confidence estimate whose square is a weighted combination of the uncorrelated confidence estimate and the square of the correlated confidence estimate; and using the compound confidence estimate as an estimate of the uncertainty of the position of the radio transmitter due to the uncertainty in the position estimates of the plurality of radio receiver positions.

The method may further comprise: forming an estimate of a weighting uncertainty in the position of the radio transmitter due to the mechanism by which the receiver weighting values are formed and optionally systematic errors due to the position of the radio transmitter being calculated by means of a weighted centroid; and combining the compound confidence estimate and the weighting uncertainty in quadrature so as to form an estimate of the total uncertainty in the estimated position of the radio transmitter.

Suitably the predetermined coordinate system is one in which two-dimensional positions are expressed with respect to magnetic north or a geodetic coordinate system.

According to a fourth aspect of the present disclosure there is provided a radio receiver operable to estimate the position of a radio transmitter, the radio receiver being arranged to move between a plurality of radio receiver positions and being operable to determine its position uncertainty at each of those positions as an uncertainty ellipse having major and minor axes, and the radio receiver comprising: an antenna for receiving signals from the radio transmitter; a weighting determination unit configured to form in dependence on signals received from the radio transmitter a set of transmitter weighting values each expressing a measure of the distance of the radio transmitter from the radio receiver positions; and a position calculation unit configured to estimate the position of the radio transmitter by: for each of the plurality of radio receiver positions, scaling an uncertainty vector describing the orientation of the respective uncertainty ellipse in a predetermined coordinate system by a scaling value dependent on the respective receiver weighting value and rotating that uncertainty vector by multiplying its argument by a factor of four; summing the scaled vectors of the plurality of radio receiver positions so as to form a total vector; dividing the argument of the total vector by a factor of four and using the resulting rotated total vector to define a compound coordinate basis comprising first and second coordinate axes; and forming an estimate of the two-dimensional position of the radio transmitter in the compound coordinate basis by: projecting the major and minor axes of each uncertainty ellipse onto the first and second coordinate axes so as to form a set of projected components for each axis; summing the projected components of each axis so as to form a total uncertainty along each axis; for each uncertainty ellipse, forming first and second coordinate axis weighting values from the respective transmitter weighting values scaled such that the first/second coordinate axis weighting value decreases as the total uncertainty along that first/second coordinate axis increases; and calculating the position of the radio transmitter by means of a weighted centroid using the first and second coordinate axis weighting values and the radio receiver positions expressed in the compound coordinate basis.

BRIEF DESCRIPTION OF THE DRAWINGS

The present disclosure will now be described by way of example with reference to the accompanying drawings, in which.

DETAILED DESCRIPTION

Figure 1:
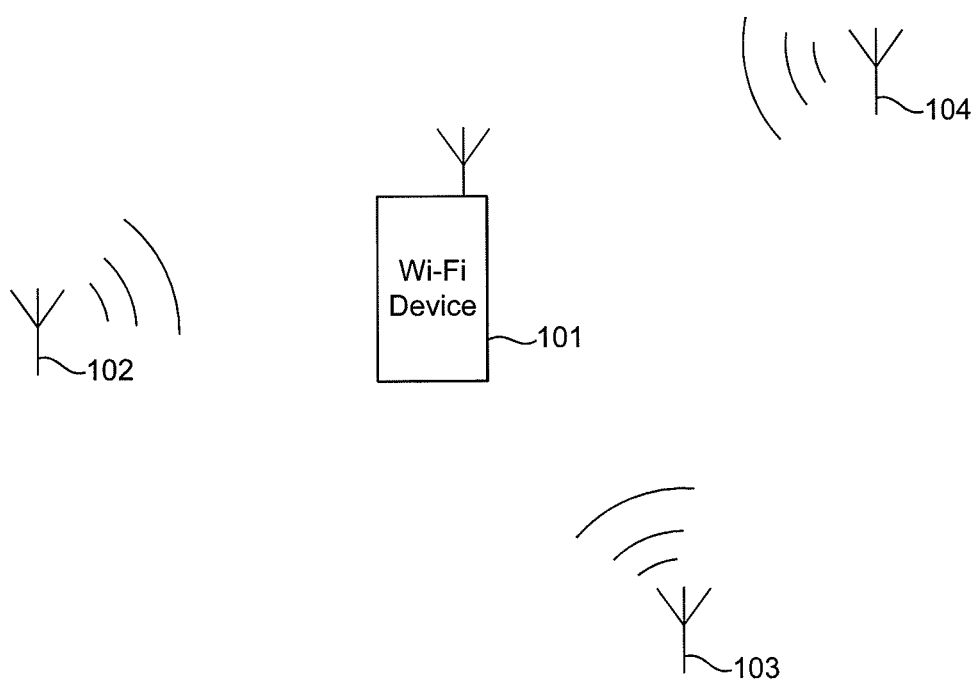
FIG. 1 is a schematic diagram of a radio receiver and a set of radio transmitters with respect to whom the position of the radio receiver is to be determined.

The following description is presented to enable any person skilled in the art to make and use the disclosure, and is provided in the context of a particular application. Various modifications to the disclosed embodiments will be readily apparent to those skilled in the art.

The general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

The methods of the present disclosure can be used by any radio-enabled device in determining its position with respect to a set of one or more radio devices with which signals can be communicated at least one way, and will be described herein with reference to Wi-Fi receivers and transmitters (access points). Often, each Wi-Fi receiver and each transmitter will in fact be a transceiver capable of transmitting and receiving Wi-Fi signals but this need not be the case. The methods of the present disclosure need not be performed at a radio receiver itself and could be performed at a server or other remote entity accessible to the radio receiver. For example, if the radio receiver is a smartphone, the calculations required to determine the position and uncertainty in the position of a radio receiver in accordance with the present disclosure could be performed at a server connected to a mobile network. The results (calculated location and/or uncertainty in that location) could then be transmitted to the device for use at the device.

The methods of the present disclosure apply equally to: (a) determining the position of a radio receiver with respect to a set of radio transmitters of known location; and (b) determining the position of a radio transmitter with respect to a set of radio receivers of known location/a radio receiver present at multiple locations (i.e. a radio receiver that is moveable with respect to the transmitter). Thus, it is not important whether the device whose position is to be determined is a transmitter or receiver, provided the receiver(s) can receive one or more signals from the transmitter(s).

The present disclosure will now be described for a first embodiment, case (a), in which the position of a radio receiver is to be determined with respect to a set of radio transmitters.

The position of a radio receiver can be determined to a first approximation from the position of only one radio transmitter within range of the receiver: i.e. the receiver can assume that its location is the location of the radio receiver. However, a more accurate location of a radio receiver can be estimated when the location of further radio transmitters that are within range of the receiver are known. A radio receiver would typically estimate its position from the positions of the radio transmitters weighted by the signal strength of signals received at the receiver from each of the transmitters.

A radio receiver could be adapted to refine its position estimate in dependence on further location information, such as a partial GPS location fix, or other reference points of known location. Other information can also be used to refine the location estimate of a radio receiver, such as information describing the direction in which radio signals are transmitted by at least some of the transmitters (e.g. the radio transmitters could have directional antennas and could provide information identifying the direction in which transmissions to the receiver are directed) or the direction in which radio signals are received at a device. It is envisaged that such refinements can be used in combination with the present disclosure in order to establish the position of a radio receiver.

FIG. 1 illustrates a Wi-Fi device 101 configured to determine its position with respect to a set of Wi-Fi access points 102, 103, 104. Each access point is of known position but has an associated uncertainty in that position (the uncertainty could be zero or a default value for any access points that have an unknown uncertainty in their position). If a measure of the distance from device 101 to each access point (AP) can be determined, the position of the device can be calculated with respect to the known locations of the APs.

Figure 4:
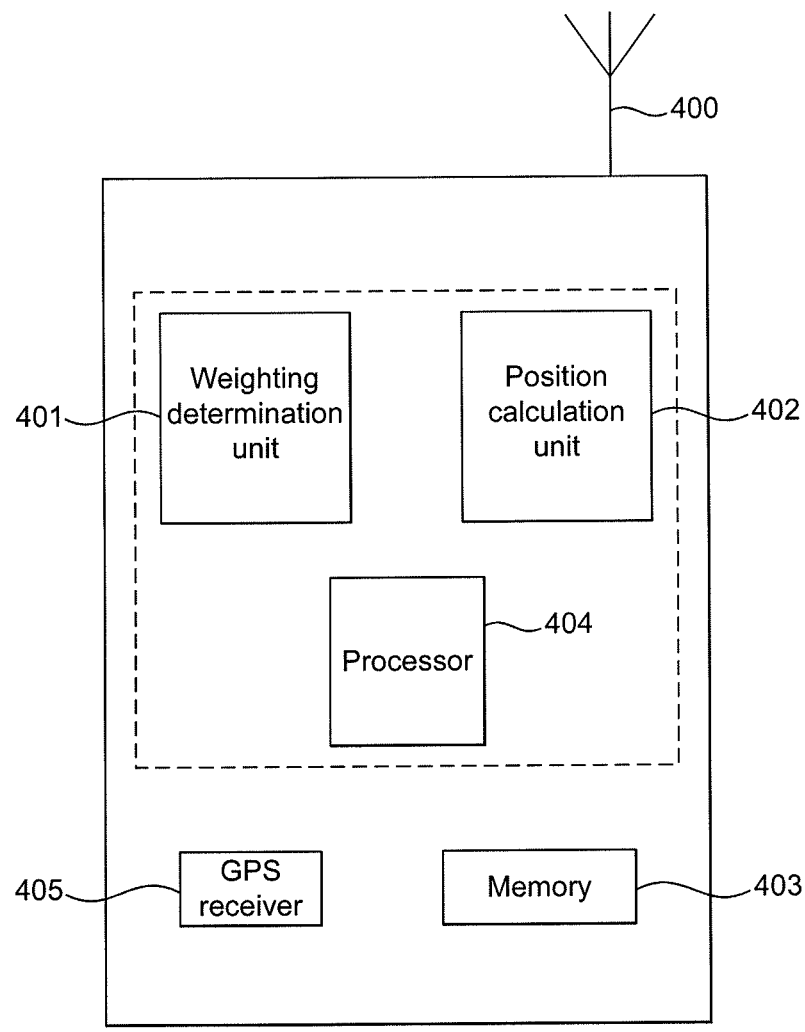
FIG. 4 is a schematic diagram illustrating a radio receiver configured in accordance with the present disclosure.

Device 101 could be configured according to the exemplary structure illustrated in FIG. 4, comprising an antenna 400 for receiving radio signals (e.g. from Wi-Fi access points), a weighting determination unit 401 for determining a weighting value that expresses a measure of the distance from the device to each of the access points, a position calculation unit for calculating its position according to the principles of the present disclosure, and a memory 403 for storing the parameters of the uncertainty ellipses of a set of access points. Units 401 and 402 could be independent hardware units, or aspects of the same hardware unit, and are preferably functions of software or firmware executing at a processor 404 of the radio receiver.

As is well known in the art, a weighting value expressing a measure of the distance from device 101 to each AP could be determined, for example, from the time it takes signals to propagate between the two, or from measures of the strength of signals received at the device from each AP given their transmission power (which each AP could report to the device). Calculations of weighting values based on propagation time could be performed at the device, at the AP, or at a third entity (such as a remote server) and are typically based on the round trip time that a message takes to travel from the device to the AP and back again. Calculations of weighting values based on received signal strength could also be performed at the device, at the AP, or at a third entity, and would typically use a radio propagation model appropriate to the transmitter's environment.

The observed signal strengths from a set of access points can be converted to a weighting value for each access point such that the position of the device can be calculated by means of a weighted centroid, as given in equation 1.1 above. The weighting values for each AP need not therefore represent an estimate of the actual distance from the device to the respective AP and may merely express in a broad sense some measure of the distance from the device to the respective AP in arbitrary units, with the weight assigned to an AP monotonically decreasing as the distance to that AP increases.

Figure 2:
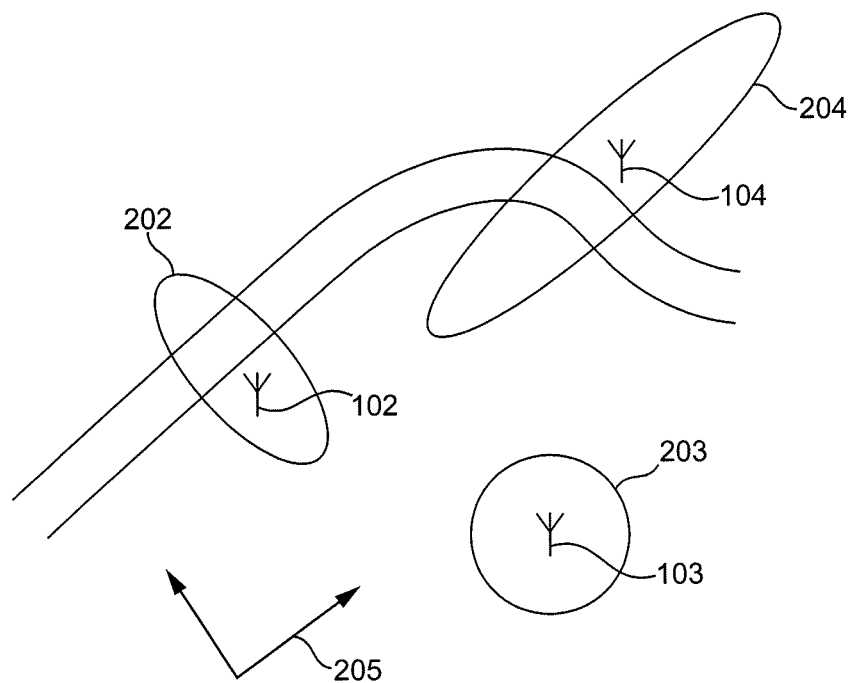
FIG. 2 is a diagram illustrating the set of radio transmitters of FIG. 1 along with their respective uncertainty ellipses.

The position of each access point has an associated uncertainty that is illustrated in FIG. 2 by a respective uncertainty ellipse 202, 203 or 204. Each access point is located at the centre of its respective uncertainty ellipse, with the ellipse indicating the degree to which the position of that access point is uncertain and the directionality of that uncertainty. Ellipse 203 of access point 103 is actually a circle indicating that either the uncertainty in the position of that access point is equi-directional or the directionality of the uncertainty in its position is unknown and can therefore be expressed by a single value expressing the error in its position (i.e. the radius of circle 203).

The uncertainty in the position of access points can be determined in any number of ways, including:

through the use of scanning vehicles that are configured to build up a database of Wi-Fi access points (i.e. AP identifiers and a location) could estimate the uncertainty in the position of detected access points and the shape of the uncertainty in the position of detected access points—this can be achieved by mapping how the strength of signals from an AP varies with position;

if an access point is known to be located at a particular address, the uncertainty in the location of that access point is limited by the resolution provided by that address—for example, with no further information being available an AP could be located anywhere in the building at that address and the uncertainty in the position of the AP can be taken to be roughly the size and shape of the building at that address;

where it is difficult to accurately establish the location of an AP (e.g. it can be difficult or impossible to establish a position using a GPS receiver deep within a large building) and a location is roughly measured from a point having a known location (e.g. the corner of a building), an estimate of the uncertainty in that measurement can be estimated from a knowledge of the measurement techniques and equipment used.

Figure 3:
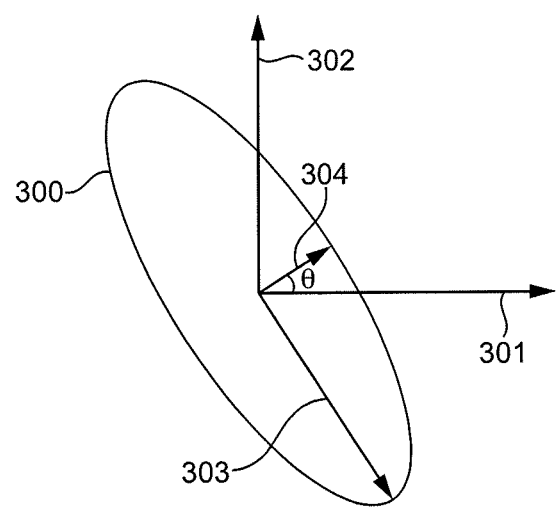
FIG. 3 is a diagram illustrating an uncertainty ellipse and its measurements.

However the uncertainty in the position of an AP is determined, the uncertainty can be stored in a positioning database of Wi-Fi access points along with the AP positions themselves and the identifiers of the APs (e.g. their SSIDs) for use by Wi-Fi devices wishing to establish their position in accordance with a Wi-Fi positioning algorithm. With reference to FIG. 3, the position uncertainty for a given AP can be stored as an uncertainty ellipse 300 for each AP:

lengths of the major $U_{major}$ and minor $U_{minor}$ axes of the uncertainty ellipse expressing the uncertainty in the position of the AP, along with an angle $\theta$ indicating the orientation of the ellipse relative to some predetermined direction (e.g. north, or some other system of latitude 301 and longitude 302); or a pair of vectors $\underline{U}_{major}$ and $\underline{U}_{minor}$ defining the lengths of the major 303 and minor 304 axes of the uncertainty ellipse and their orientation relative to some predetermined direction.

Preferably the orientation of an uncertainty ellipse is expressed with respect to a predetermined coordinate system: this could be as straightforward as expressing the orientation of the uncertainty ellipse with respect to a predetermined direction (e.g. magnetic north) and the dimensions of the uncertainty ellipse in predetermined units (e.g. meters), or by expressing orientation according to an established geodetic system, such as WGS84.

By way of illustration, the location of a road 200 is shown in FIG. 2 indicating how the orientation of the position uncertainty of an AP stored in a positional database can depend on how its position was determined: a scanning vehicle travelling along the road will typically be able to determine the position of an AP with greater resolution in a direction parallel to the road than in a direction perpendicular to the road (i.e. in a direction along which the vehicle does not move and therefore cannot accurately resolve the position of the AP due to a variation in signal strength/time-of-flight measurements).

The present disclosure recognizes that the position of a device 101 that is within range of APs 102-104 can efficiently establish its position and determine the uncertainty in that position if the position and uncertainty calculations are performed with respect to a coordinate basis selected to reflect the net asymmetry of the ellipses defining the position uncertainties of the APs. For example, in the arrangement of APs shown in FIG. 2, axes 205 would be a good choice of basis set in which to perform the position calculations described herein.

A method in accordance with the present disclosure for determining a suitable coordinate basis for a set of i access points 102-104 within range of a device 101 whose location is to be determined will now be described by way of example. Each AP has a known location $r_i$ and a known associated uncertainty ellipse expressing the uncertainty in that location. Each uncertainty ellipse is defined by a major axis length $U_{major, i}$ and a minor axis length $U_{minor, i}$ and an angle θ between the minor axis and a predetermined direction (typically chosen to be north, or a latitudinal or longitudinal direction), as illustrated in FIG. 3. The parameters of each uncertainty ellipse are therefore specified according to a predetermined coordinate system (i.e. relative to north or a latitudinal or longitudinal direction). Furthermore, each AP has an associated weighting value $w_i$ that represents a measure of the distance from the device to the respective AP. Techniques for calculating suitable weighting values are well known in the art, as is discussed above.

Firstly, a scaling value $\kappa_{0, i}$ is formed whose magnitude scales such that: (i) transmitters having high weighting values increase the scaling value; (ii) transmitters having anisotropic uncertainty ellipses increase the scaling value; and (iii) transmitters having a low position uncertainty increase the scaling value. A suitable equation that has these characteristics is set out in equation 1.2, according to which the scaling value is given by the product of the AP distance weighting, the square root of the ratio of the major to minor axis lengths of the respective uncertainty ellipse and a factor that depends on the minor axis of the uncertainty ellipse of the AP (note that the i indices have been dropped from the major and minor axis lengths). Alternatively, the last factor of the equation could depend on the major axis of the uncertainty ellipse of the AP.

The last factor in equation 1.2 ensures that the scaling value falls to 0 when the size of the minor axis of an uncertainty ellipse is greater than $U_{cutoff}$, whose magnitude will depend on the type of the respective transmitter but for typical Wi-Fi access points is preferably no greater than 100 m, more preferably no greater than 75 m, and most preferably no greater than 60 m (other values can be used if the units of length are other than meters). The last factor suitably rises linearly as the uncertainty reduces to 0. $\kappa_{0, i}$ hence ensures that the points that are important to the calculation and have small, asymmetric uncertainty ellipses receive the highest weighting.

$$\kappa_{0,i} = w_i \sqrt{\frac{U_{major}}{U_{minor}}} \max(U_{cutoff} - U_{minor}, 0) \quad (1.2)$$

A unit vector $n_i$ is then formed (if not already available) for each of the uncertainty ellipses of the APs. The unit vector of an uncertainty ellipse is selected to have a direction based on the direction θ that the minor axis of the ellipse makes with the predetermined direction: however, the angle θ is multiplied by 4 because of the 4-fold symmetry inherent in the axis choice—i.e. it does not matter if the unit vector aligns with the major or minor axis of the ellipse and it does not matter whether it is the positive or negative branch of the axis. A resultant vector K is then formed by summing the unit vector of each AP multiplied by its respective $\kappa_{0, i}$ scaling value, as shown in equation set 1.3. If the major and minor axes of each of the uncertainty ellipses of the set of APs are conveniently aligned with the latitude and longitude axes of FIG. 3, then their unit vectors will constructively add together and K will lie along the axis of latitude or longitude.

The resultant vector K is now preferably normalized and its angle (argument) divided by 4 to yield a unit basis vector in the first quadrant, also shown in equation set 1.3. This unit basis vector is denoted u and forms the first axis of an optimum coordinate basis for the set of APs. The second axis of the coordinate basis set is given by a normalized basis vector v that is selected to be orthogonal to vector u. Thus, if u has components (a, b) then v has components (−b, a).

$$K = \sum_{i=0}^{N} \kappa_{0,i} n_i (4\theta) \quad (1.3)$$

$$u = n(\arg(K)/4)$$

Note that arg(K) is the angle the vector K makes to the predetermined direction. Alternatively, non-orthogonal but linearly independent axes can be defined. This can be useful if the uncertainty ellipses of a set of access points accessible to a receiver have been determined according to measurements performed in directions that do not lie in longitudinal or latitudinal directions. For example, if a particular city plan has roads that run SW-NE and W-E (i.e. roughly 45 degrees offset from one another) and the uncertainty ellipses have been determined by scanning vehicles that have moved along those roads, then it can be advantageous to define a non-orthogonal basis whose axes align with the road system of the city.

Once the new coordinate basis has been formed, the uncertainty ellipse of each AP can be projected onto the new basis set. Firstly, the lengths of the major and minor axes of each ellipse are projected onto the axes of the predetermined coordinate system (in this case the latitude and longitude axes shown in FIG. 3) so as to yield vectors describing the major and minor axes of each uncertainty ellipse in the predetermined coordinate system. Then these components are projected onto the u, v coordinate basis to give vectors describing the major and minor axes of each uncertainty ellipse in the new basis. This can be achieved through the use of appropriate transformation matrices, as shown in the first two equations of equation set 1.4.

$$\begin{pmatrix} U_{minor,u} \\ U_{minor,v} \end{pmatrix} = \begin{pmatrix} a & b \\ -b & a \end{pmatrix} \begin{pmatrix} U_{minor,lat} \\ U_{minor,lon} \end{pmatrix} \quad (1.4)$$

$$\begin{pmatrix} U_{major,u} \\ U_{major,v} \end{pmatrix} = \begin{pmatrix} a & b \\ -b & a \end{pmatrix} \begin{pmatrix} U_{major,lat} \\ U_{major,lon} \end{pmatrix}$$

$$U_{total,u} = \sqrt{U_{minor,u}^2 + U_{major,u}^2}$$

$$U_{total,v} = \sqrt{U_{minor,v}^2 + U_{major,v}^2}$$

$$w_{i,u} = w_i \max\left(1 - \frac{U_{total,u}}{U_{cutoff}}, \kappa_{min}\right)$$

$$w_{i,v} = w_i \max\left(1 - \frac{U_{total,v}}{U_{cutoff}}, \kappa_{min}\right)$$

Alternatively, if each uncertainty ellipse is defined with respect to its own particular basis, each uncertainty ellipse must be projected onto the axes of its own particular basis prior to transformation into a common predetermined basis and subsequent transformation into the u, v coordinate basis. Note that in this case the angle θ of each uncertainty ellipse is defined relative to its own basis set and must therefore be converted into an angle in the common predetermined basis prior to its use at the step of the method expressed by equation set 1.3.

The major and minor components of each uncertainty ellipse are then summed to obtain total uncertainty contributions along the first and second coordinate axes, as shown in the middle two equations of equation set 1.4.

Finally, the total uncertainty contributions are then used to calculate first and second coordinate axis weighting values, each weighting value being formed from a product of the respective AP distance weighting value $w_i$ and a modifying factor that down-weights uncertain AP positions in the position calculation. A dimensionless constant $\kappa_{min}$ (having a range between 0 and 1) is used to set the minimum weighting for each access point, as shown by the last two equations of equation set 1.4. A value of ⅛ has been found to be suitable. Note that the coordinate axis weighting values in the calculation do not correspond directly to uncertainties Now the appropriate weighting values have been formed for the new first and second coordinate axes, the position Δu of device 101 can be calculated by means of a weighted centroid performed in the new u, v basis, as shown in equation 1.5. The positions $r_i$ of the set of APs in the predetermined coordinate basis must therefore be converted into a set of positions $\Delta u_i$ in the new u, v coordinate basis.

$$\Delta u = \frac{\sum_i w_{i,u} \Delta u_i}{\sum_i w_{i,u}} \quad (1.5)$$

Once the position Δu of device 101 has been calculated in the new coordinate basis, the result can be transformed back to the original predetermined coordinate basis (e.g. by using the transpose of the above transformation matrix) for use as the position of device 101.

Establishing the u, v coordinate basis further allows the confidence in the calculated position of device 101 to be determined due to the uncertainty in the location of each of the APs. Calculation of the confidence proceeds as follows. Firstly, the square of a measure of the total uncertainty $U_{AP}$ in the positions of the APs is estimated. This total uncertainty $U_{AP}$ is formed independently for the first and second coordinate axes from the sum of a correlated confidence estimate α and a de-correlated confidence estimate β. Each confidence estimate is a weighted sum formed as shown in equation set 1.6 for the first coordinate axis u.

$\alpha_u = \Sigma(u_{i,u} w_{i,u})^2 / (\Sigma w_{i,u})^2$ $\beta_u = \Sigma(u_{i,u} w_{i,u})^2 / (\Sigma w_{i,u})^2$ $U_{AP}^2 = (\alpha_u^2 + \beta_u)/2 \quad (1.6)$ The rationale for this is to independently consider sums of the respective axis weighting values in the cases when they are completely correlated and completely de-correlated. When completely de-correlated we obtain $\beta_u$. When completely correlated we obtain $\alpha_u$. The result $U_{AP}^2$ is somewhere between an average of the two (although note that this does not quite correspond to a correlation coefficient of 0.5).

The full confidence in the position of the device 101 is formed independently for each coordinate axis by combining the uncertainty $U_{AP}^2$ for the respective coordinate axis with the uncertainty that would be expected in the calculated position of the device $U_{POS}$ (i.e. the error in the position of the device) if the transmitter locations were exactly known. In other words, $U_{POS}$ is the contribution to receiver position uncertainty due to the positioning calculation performed relative to the AP and is present even if there is no uncertainty in the AP locations themselves. How $U_{POS}$ is determined will depend on the method by which the weighting values $w_i$ that represent a measure of the distance from the device to each AP are determined. For example, if the weights are determined from the signal strength of signals received at the receiver from the AP then $U_{POS}$ is determined from the net uncertainty due to the error contributions inherent in those weighting values. It will be apparent to a person of skill in the art how to calculate $U_{POS}$ as a measure of the uncertainty in the position of a receiver due to the particular method used to determine the position of the receiver relative to the AP.

Continuing the example in which the weighting values of the access points are determined from received signal strength at the receiver, the uncertainty $U_{POS}$ arises because the weights are typically formed assuming a particular relationship between signal strength and distance. However, in practice signal strength measurements are subject to both random measurement noise and also occlusion, particularly in indoor environments. A further contribution to the uncertainty comes from the fact that the weighted centroid is a robust and effective positioning algorithm in the presence of noise but has systematic errors that mean that even in an ideal propagation environment and with perfect measurements there will be some uncertainty in the receiver position. The uncertainty of a given weighting value due to these effects can be empirically modeled based on observed signal strengths, and the uncertainties of the weighting values of each of the access points then combined by summing the individual uncertainties in quadrature so as to form the net error $U_{POS}$.

This combination of $U_{AP}$ and $U_{POS}$ is shown for the u coordinate axis in equation 1.7.

$$U_u = \sqrt{U_{AP,u}^2 + \frac{U_{POS}^2}{2}} \quad (1.7)$$

This yields an uncertainty ellipse for device 101 for which the greater of $U_u$ and $U_v$ defines the major axis length and the lesser of $U_u$ and $U_v$ defines the minor axis length. The orientation of the uncertainty ellipse of the device in the predetermined coordinate system can be calculated from the rotational offset between the basis of the predetermined coordinate system and the u, v coordinate basis.

A second embodiment of the present disclosure corresponding to case (b) identified above will now be described, in which the position of a radio transmitter is determined with respect to a set of radio receivers of known location/a radio receiver present at multiple locations. A "set" of radio receivers is discussed below but it is to be understood that the set of radio receivers could be a single radio receiver present at different locations (e.g. as a result of having moved with respect to the radio transmitter whose position is to be determined).

Figure 5:
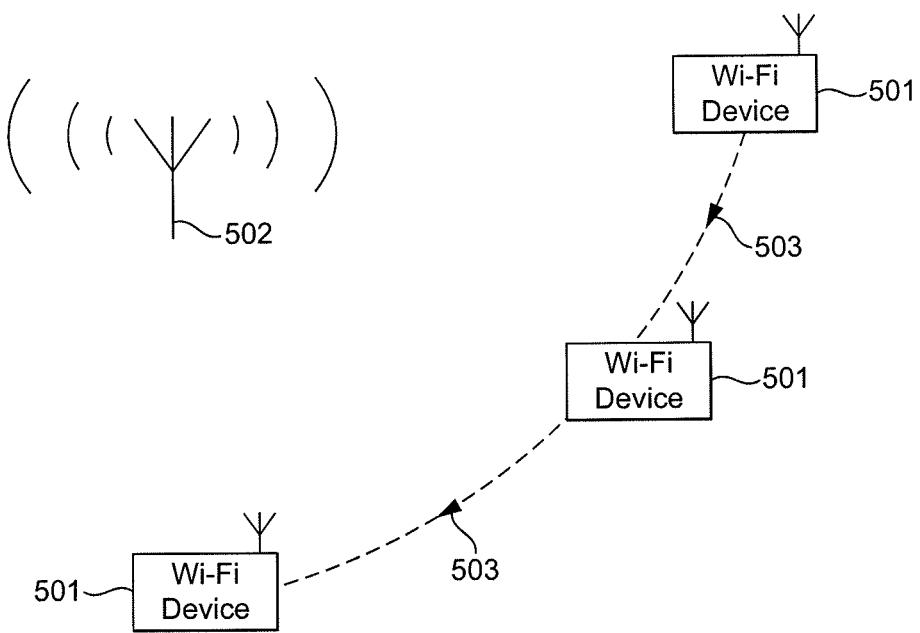
FIG. 5 is a schematic diagram illustrating a Wi-Fi access point and a set of Wi-Fi receivers with respect to whom the position of the access point is to be determined.

FIG. 5 illustrates a set of Wi-Fi receivers 501 of known position arranged about a Wi-Fi access point 502 so as to determine the position of the access point. Wi-Fi receivers 501 could be a single Wi-Fi receiver provided at a scanning vehicle that moves along path 503 so as to be located at the three locations of receiver 501 at different points in time.

Alternatively, the receivers 501 could be distinct receivers arranged in space about access point 502. Each receiver is of known position but has an associated uncertainty in that position—for example, the receiver could be provided at a scanning vehicle having a GPS receiver and the uncertainty could be the uncertainty in its GPS position. If a measure of the distance from the receivers 501 to access point 502 can be determined, the position of the access point can be calculated with respect to the known locations of the receivers.

Each receiver could have the structure of the exemplary device shown in FIG. 4 comprising an antenna 400 for receiving radio signals (e.g. from Wi-Fi access points), a weighting determination unit 401 for determining a weighting value that expresses a measure of the distance from the device to an access point, a position calculation unit for calculating its position according to the principles of the present disclosure, and a memory 403 for storing the parameters of the uncertainty ellipses of the receivers. Units 401 and 402 could be independent hardware units, or aspects of the same hardware unit, and are preferably functions of software or firmware executing at a processor 404 of the radio receiver. In this embodiment, each receiver preferably comprises a GPS receiver 405 or other means by which it determines its position.

The method of the present disclosure, as described above in relation to the first embodiment, can be applied but with the roles of transmitter and receiver switched: now the position of a transmitter is to be determined and there is a set of receivers (or one receiver present at multiple locations) whose positions are known and which each have an associated uncertainty ellipse. The uncertainty ellipse of each receiver expresses the uncertainty in the position of the respective receiver along the two axes 303 and 304 shown in FIG. 3. The position uncertainty of a receiver is preferably determined according to the mechanism by which the position of the receiver is determined: for example, if the position of a receiver is determined using a GPS receiver, the position uncertainty can be derived from the uncertainty in the position estimate calculated according to the GPS receiver. This might be expressed as a single uncertainty value for a receiver, in which case the uncertainty ellipse of that receiver is a circle. However, if directional uncertainty information is available (as it typically is from GPS measurements since both latitudinal and longitudinal errors are reported) an uncertainty ellipse can be formed.

As has been described in relation to the first embodiment, a weighting value expressing a measure of the distance from receiver 501 to the access point 502 is determined. Each weighting value is preferably calculated from measures of the strength of signals received at the device from each AP given their transmission power (which each AP could report to the device). Alternatively, each weighting value can be calculated from the time it takes signals to propagate between the receiver and AP.

The observed signal strengths from access point 502 at the various positions of receiver 501 can be converted to a weighting value for each position such that the position of the access point can be calculated by means of a weighted centroid, as given in equation 1.1 above. The weighting values for each receiver position need not therefore represent an estimate of the actual distance from receiver 501 to the AP and may merely express in a broad sense some measure of the distance from the receiver to the AP in arbitrary units, with the weight assigned to a receiver position monotonically decreasing as the distance to that AP increases. For a single receiver 501 moving between the positions shown in FIG. 5, the receiver 501 or another entity (such as a server) could calculate the position of the access point 502. If the receivers 501 are a set of distinct receivers then their weighting values are combined at one of the receivers, or at another entity (such as a server) so as to perform the calculation according to equation 1.1, as well as subsequent calculations.

Preferably the orientation of the uncertainty ellipses of the receivers is expressed with respect to a predetermined coordinate system: this could be as straightforward as expressing the orientation of the uncertainty ellipse with respect to a predetermined direction (e.g. magnetic north) and the dimensions of the uncertainty ellipse in predetermined units (e.g. meters), or by expressing orientation according to an established geodetic system, such as WGS84.

The present disclosure recognizes that the position of access point 502 can be established along with a determination of the uncertainty in that position if the position and uncertainty calculations are performed with respect to a coordinate basis selected to reflect the net asymmetry of the ellipses defining the position uncertainties of the receivers 501. The method of the present disclosure is performed in the same manner for the access point from the set of receiver positions and their associated uncertainty ellipses as it is for a receiver device from a set of access points and their associated uncertainty ellipses (which could in turn have been determined in accordance with the present disclosure).

Thus, in equations 1.2 and 1.3 above can be used to calculate a suitable coordinate basis u, v for a set of i receivers 501 within range of an access point 502 whose location is to be determined. Each receiver has a known location $r_i$ and a known associated uncertainty ellipse expressing the uncertainty in that location. Each uncertainty ellipse is defined by a major axis length $U_{major,i}$ and a minor axis length $U_{minor,i}$ and an angle θ between the minor axis and a predetermined direction (typically chosen to be north, or a latitudinal or longitudinal direction). The parameters of each uncertainty ellipse are therefore specified according to a predetermined coordinate system (i.e. relative to north or a latitudinal or longitudinal direction). Furthermore, each receiver has an associated weighting value $w_i$ that represents a measure of the distance from the access point to the respective receiver. Techniques for calculating suitable distance weighting values are well known in the art, as is discussed above.

Once the new coordinate basis has been formed, the uncertainty ellipse of each receiver 501 can be projected onto the new u, v basis set. This can be achieved through the use of appropriate transformation matrices, as shown in the first two equations of equation set 1.4.

The major and minor components of each uncertainty ellipse are then summed to obtain total uncertainty contributions along the first and second coordinate axes, as shown in the middle two equations of equation set 1.4.

Finally, the total uncertainty contributions are used to calculate first and second coordinate axis weighting values, each weighting value being formed from a product of the respective receiver distance weighting value $w_i$ and a modifying factor that down-weights uncertain receivers in the position calculation. This can be achieved using the last two equations of equation set 1.4.

Now the appropriate receiver weighting values have been formed for the new first and second coordinate axes, the position Δu of access point 502 can be calculated by means of a weighted centroid performed in the new u, v basis, as shown in equation 1.5. The positions $r_i$ of the set of receivers in the predetermined coordinate basis must therefore be converted into a set of positions $\Delta u_i$ in the new u, v coordinate basis.

Once the position Δu of access point 502 has been calculated in the new coordinate basis, the result can be transformed back to the original predetermined coordinate basis (e.g. by using the transpose of the above transformation matrix) for use as the position of the access point.

Establishing the u, v coordinate basis further allows the confidence in the calculated position of access point 502 to be determined due to the uncertainty in the location of each of the APs. This confidence $U_{AP}$ can be calculated according to equation set 1.6, which illustrates the calculations that can be performed for the first coordinate axis u (equivalent equations describe the calculations for the second coordinate axis.

The full confidence in the position of the access point is formed independently for each coordinate axis by combining the uncertainty $U_{AP}^2$ for the respective coordinate axis with the uncertainty that would be expected in the calculated position of the access point $U_{POS}$ (i.e. the error in the position of the access point) if the receiver locations were exactly known. In other words, $U_{POS}$ is the contribution to access point position uncertainty due to the positioning calculation performed relative to the receivers and is present even if there is no uncertainty in the receiver positions themselves. How $U_{POS}$ is determined will depend on the method by which the weighting values $w_i$ that represent a measure of the distance from the AP to each receiver position is determined. For example, if the weights are determined from the signal strength of signals received at the receivers from the AP then $U_{POS}$ is determined from the net uncertainty due to the error contributions inherent in those weighting values. It will be apparent to a person of skill in the art how to calculate $U_{POS}$ as a measure of the uncertainty in the position of an AP due to the particular method used to determine the position of the AP relative to a set of receivers.

Continuing the example in which the weighting values of the access points are determined from received signal strength at the receivers, the uncertainty $U_{POS}$ arises because the weights are typically formed assuming a particular relationship between signal strength and distance. However, in practice signal strength measurements are subject to both random measurement noise and also occlusion, particularly in indoor environments. A further contribution to the uncertainty comes from the fact that the weighted centroid is a robust and effective positioning algorithm in the presence of noise but has systematic errors that mean that even in an ideal propagation environment and with perfect measurements there will be some uncertainty in the receiver position. The uncertainty of a given weighting value due to these effects can be empirically modeled based on observed signal strengths, and the uncertainties of the weighting values of each of the receivers then combined by summing the individual uncertainties in quadrature so as to form the net error $U_{POS}$.

The combination of $U_{AP}$ and $U_{POS}$ is shown for the u coordinate axis in equation 1.7.

In this manner, an uncertainty ellipse for access point 502 can be calculated for which the greater of $U_u$ and $U_v$ defines the major axis length and the lesser of $U_u$ and $U_v$ defines the minor axis length. The orientation of the uncertainty ellipse of the device in the predetermined coordinate system can be calculated from the rotational offset between the basis of the predetermined coordinate system and the u, v coordinate basis. This provides a mechanism by which the position and uncertainty ellipses of access points can be calculated—for example, by a scanning vehicle comprising a Wi-Fi receiver. Such information can be stored at a positioning database for use in the calculation of Wi-Fi device positions with respect to a set of access points in accordance with the first embodiment of the present disclosure.

The present disclosure described herein recognizes that combining uncertainties using fixed axes can lead to a larger uncertainty in a position estimate formed by means of a weighted centroid, and provides a method of calculating a better set of axes with respect to which the uncertainty in a position estimate can be minimized and the position estimate itself can be calculated with better accuracy.

The term vector is used herein to refer to a direction and corresponding magnitude expressed in any manner whatsoever and is not to be taken as being limited to a column vector quantity having first and second values. The use of vectors referred to in the description and claims is therefore to be understood to encompass the use of vectors in mathematical calculations and other operations in any form whatsoever, including as column vectors, as an angle and magnitude, and as abstract representations of a direction and magnitude expressed according to a digital data storage scheme (e.g. binary) or other predetermined encoding. The vectors referred to herein may therefore be manipulated through the performance of calculations using, for example, binary information representing a given vector, a column vector, and an angle and magnitude.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

The invention claimed is:

1. A method of forming an estimate of a two-dimensional position of a radio receiver relative to a plurality of radio transmitters each radio transmitter having an associated position estimate and a position uncertainty expressed as an uncertainty ellipse having major and minor axes, respective lengths and orientations of the major and minor axes defining the uncertainty ellipse, the method comprising:

receiving the position estimates and position uncertainties of the plurality of radio transmitters;

receiving at the radio receiver respective signals from the plurality of radio transmitters and forming, by a weighting determination unit, in dependence on the received signals respective transmitter weighting values each weighting value being inversely proportional to a measure of distance between a respective radio transmitter of the plurality of radio transmitters and the radio receiver;

for each of the plurality of radio transmitters, scaling, by a position calculation unit, an uncertainty vector having an argument describing an orientation of the respective uncertainty ellipse in a predetermined coordinate system, defined relative to the major and minor axes of the uncertainty ellipse, by a scaling value, wherein the scaling value is proportional to the respective transmitter weighting value, and rotating the scaled uncertainty vector by multiplying its argument by a factor of four, wherein the argument of the uncertainty vector represents an angle that the uncertainty vector makes relative to a predetermined direction in the predetermined coordinate system;

summing, by the position calculation unit, the scaled and rotated vectors of the plurality of radio transmitters so as to form a total vector;

dividing, by the position calculation unit, the argument of the total vector by a factor of four and using the resulting rotated total vector to define a compound coordinate basis comprising first and second coordinate axes; and forming, by a position calculation unit, an estimate of the two-dimensional position of the radio receiver in the compound coordinate basis by:

projecting the major and minor axes of each uncertainty ellipse of each of the respective transmitters onto the first and second coordinate axes so as to form a set of projected components for each of the major and minor axes of each of the uncertainty ellipses;

summing the projected components of each of the respective major and minor axes of the uncertainty ellipses, so as to form respective total uncertainty values along each of the first and second coordinate axes;

for each uncertainty ellipse, forming first and second coordinate axis weighting values from the respective transmitter weighting values scaled such that each of the first and second coordinate axis weighting values for each uncertainty ellipse decreases as the total uncertainty along the first and second coordinate axis increases; and calculating the position of the radio receiver by computing a weighted centroid using the first and second coordinate axis weighting values and the position estimates of the plurality of the radio transmitters expressed in the compound coordinate basis.

2. A method as claimed in claim 1, further comprising transforming the calculated position of the radio receiver into the predetermined coordinate system for use as an estimate of the two-dimensional position of a radio receiver.

3. A method as claimed in claim 1, wherein each uncertainty ellipse is represented by information expressing the length of the major and minor axes of the uncertainty ellipse and the orientation of at least one of the major and minor axes according to the predetermined coordinate system.

4. A method as claimed in claim 1, wherein the argument of the uncertainty vector describing the orientation of a respective uncertainty ellipse is the angle between a predetermined one of the major and minor axes of that uncertainty ellipse and the predetermined direction.

5. A method as claimed in claim 1 wherein each scaling value used in the step of scaling the uncertainty vectors of the plurality of radio transmitters is further dependent on a measure of the anisotropy of the respective uncertainty ellipse.

6. A method as claimed in claim 5, wherein the measure of the anisotropy of each uncertainty ellipse ratio is given by a ratio of the major axis length to the minor axis length of the respective uncertainty ellipse.

7. A method as claimed in claim 1, wherein each scaling value is further dependent on a measure of the length of the minor axis of the respective uncertainty ellipse relative to a first predetermined length such that each scaling value varies from a value of zero when the length of the respective minor axis is equal to the first predetermined length up to a maximum value when the length of the respective minor axis is zero.

8. A method as claimed in claim 1, wherein the step of forming each first and second coordinate axis weighting value from the transmitter weighting values is performed such that each of the first and second coordinate axis weighting values is given by the respective transmitter weighting value scaled by a factor that ranges from a predetermined minimum value when the total uncertainty along the first and second coordinate axes is at least a second predetermined length up to a maximum value when the total uncertainty along the respective first and second coordinate axis is zero.

9. A method as claimed in claim 8, wherein the first and second predetermined lengths are approximately 60 meters.

10. A method as claimed in claim 8, wherein the predetermined minimum value is ⅛.

11. A method as claimed in claim 1, wherein each uncertainty ellipse is defined with respect to the predetermined coordinate system.

12. A method as claimed in claim 1, wherein the first coordinate axis is represented by a normalised vector coincident with the rotated total vector and the second coordinate axis is represented by a normalised vector non-coincident with the rotated total vector.

13. A method as claimed in claim 1, wherein the first and second coordinate axes are defined so as to form an orthogonal basis set.

14. A method as claimed in claim 1, wherein the radio receiver is configured to receive the position estimate and position uncertainty of each of the plurality of radio transmitters by means of one or more of:

radio signals transmitted from one or more of the plurality of radio transmitters;

a database stored at the radio receiver; and a database remotely accessible to the radio receiver.

15. A method as claimed in claim 1, wherein each uncertainty vector describing the orientation of a respective uncertainty ellipse is a unit vector defining the direction of the major or minor axis of that uncertainty ellipse in the predetermined coordinate system.

16. A method as claimed in claim 1. wherein the predetermined coordinate system is one in which two-dimensional positions are expressed with respect to one of magnetic north or a geodetic coordinate system.

17. A method as claimed in claim 1, wherein each transmitter weighting value is formed in dependence on a signal strength of the respective signal received from the respective radio transmitter, each transmitter weighting value being greater for a greater received signal strength.

18. A method as claimed in claim 17, wherein each transmitter weighting value is scaled in dependence on the transmission power of the respective radio transmitter such that, prior to the scaling, the transmitter weighting values are approximately independent of the transmission power of the respective radio transmitter, the transmission power of each radio transmitter being signalled to the radio receiver by the respective radio transmitter.

19. A method as claimed in claim 1, wherein the step of summing the projected components of each of the respective major and minor axes so as to form a total uncertainty along each of the first and second coordinate axes is performed such that the squares of the total uncertainty along the first and second axes is given by the sums of the squares of the respective projected components.

20. A method as claimed in claim 1, further comprising, for each of the first and second coordinate axes:

calculating a correlated confidence estimate by means of a weighted centroid using the respective coordinate axis weighting values and the projected components of the major and minor axes of each uncertainty ellipse along that respective coordinate axis;

calculating an uncorrelated confidence estimate by: forming for each uncertainty ellipse a product of the respective coordinate axis weighting value and a sum of the projected components along the respective coordinate axis of the major and minor axes of that uncertainty ellipse; summing, over the set of uncertainty ellipses, respective squares of the products; and, dividing by the sum, over the set of uncertainty ellipses, of respective squares of the respective coordinate axis weighting values;

forming a compound confidence estimate having a square that is a weighted combination of the uncorrelated confidence estimate and a square of the correlated confidence estimate; and using the compound confidence estimate as an estimate of uncertainty of the position of the radio receiver due to the respective uncertainties in the position estimates of the plurality of radio transmitters.

21. A method as claimed in claim 20, further comprising:
forming an estimate of a weighting uncertainty in the position of the radio receiver due to a mechanism by which the transmitter weighting values are formed and systematic errors due to the position of the radio receiver being calculated by means of a weighted centroid; and combining the compound confidence estimate and the weighting uncertainty in quadrature so as to form an estimate of the total uncertainty in the estimated position of the radio receiver.

22. A method as claimed in claim 1, wherein the plurality of radio transmitters are Wi-Fi access points and the radio receiver is a portable Wi-Fi device.

23. A radio receiver operable to estimate its position relative to a plurality of radio transmitters, the radio receiver having access to information including, for each radio transmitter, a position estimate and position uncertainty expressed as an uncertainty ellipse having major and minor axes, respective lengths and orientations of the major and minor axes defining the uncertainty ellipse, and the radio receiver comprising:

an antenna for receiving signals from the plurality of radio transmitters;

a weighting determination unit configured to form in dependence on respective signals received from the radio transmitters, respective transmitter weighting values each weighting value being inversely proportional to a measure of distance between a respective radio transmitter of the plurality of radio transmitters and the radio receiver; and a position calculation unit configured to estimate the position of the radio receiver by:

for each of the plurality of radio transmitters, scaling an uncertainty vector having an argument describing the orientation of the respective uncertainty ellipse in a predetermined coordinate system, defined relative to the major and minor axes of the uncertainty ellipse, by a scaling value, wherein the scaling value is proportional to the respective transmitter weighting value, and rotating the scaled uncertainty vector by multiplying its argument by a factor of four, wherein the argument of the uncertainty vector represents an angle that the uncertainty vector makes relative to a predetermined direction in the predetermined coordinate system;

summing the scaled and rotated vectors of the plurality of radio transmitters so as to form a total vector;

dividing the argument of the total vector by a factor of four and using the resulting rotated total vector to define a compound coordinate basis comprising first and second coordinate axes; and forming an estimate of the two-dimensional position of the radio receiver in the compound coordinate basis by:
projecting the major and minor axes of each uncertainty ellipse of each of the respective transmitters onto the first and second coordinate axes so as to form a set of projected components for each of the major and minor axes of each of the uncertainty ellipses;

summing the projected components of all of the uncertainty ellipses so as to form a total uncertainty along each of the first and second coordinate axes;

for each uncertainty ellipse, forming first and second coordinate axis weighting values from the respective transmitter weighting values scaled such that each of the first and second coordinate axis weighting values for each uncertainty ellipse decreases as the total uncertainty along that first and second coordinate axis increases; and calculating the position of the radio receiver by computing a weighted centroid using the first and second coordinate axis weighting values and the position estimates of the plurality of the radio transmitters expressed in the compound coordinate basis.

24. A method of forming an estimate of a two-dimensional position of a radio transmitter relative to a plurality of radio receiver positions each radio receiver position having a corresponding position uncertainty expressed as an uncertainty ellipse having major and minor axes, respective lengths and orientations of the major and minor axes defining the uncertainty ellipse, the method comprising;

storing, at the radio receiver, respective positions and uncertainties for the plurality of radio receiver positions and forming, by a weighting determination unit, in dependence on radio signals received from the transmitter respective receiver position weighting values each receiver position weighting value being inversely proportional to a measure of distance between the radio transmitter and a respective one of the plurality of radio receiver positions;

for each of the plurality of radio receiver positions, scaling an uncertainty vector associated with the respective position uncertainty, the uncertainty vector having an argument describing an orientation of the respective uncertainty ellipse in a predetermined coordinate system, defined relative to the major and minor axes of the uncertainty ellipse, by a scaling value, wherein the scaling value is proportional to the respective receiver position weighting value, and rotating the scaled uncertainty vector by multiplying its argument by a factor of four, wherein the argument of the uncertainty vector represents an angle that the uncertainty vector makes relative to a predetermined direction in the predetermined coordinate system;

summing, by a position calculation unit, the scaled vectors of the plurality of radio receiver positions so as to form a total vector;

dividing, by the position calculation unit, the argument of the total vector by a factor of four and using the resulting rotated total vector to define a compound coordinate basis comprising first and second coordinate axes; and forming, by the position calculation unit, an estimate of the two-dimensional position of the radio transmitter in the compound coordinate basis by;

projecting the major and minor axes of the uncertainty ellipse of each of the respective receiver positions onto the first and second coordinate axes so as to form a set of projected components for each of the major and minor axes of the uncertainty ellipses;

summing the projected components of each of the respective major and minor axes of the uncertainty ellipses so as to form a total uncertainty along each of the first and second coordinate axes;

for each uncertainty ellipse, forming first and second coordinate axis weighting values from the respective receiver position weighting values scaled such that each of the first and second coordinate axis weighting values for each uncertainty ellipse decreases as the total uncertainty along the first and second coordinate axis increases; and calculating the position of the radio transmitter by computing a weighted centroid using the first and second coordinate axis weighting values and the radio receiver positions expressed in the compound coordinate basis.

25. A method as claimed in claim 24, further comprising transforming the calculated position of the radio transmitter into the predetermined coordinate system for use as an estimate of the two-dimensional position of a radio transmitter.

26. A method as claimed in claim 24, wherein the argument of the uncertainty vector describing the orientation of a respective uncertainty ellipse is the angle between a predetermined one of the major and minor axes of that uncertainty ellipse and the predetermined direction.

27. A method as claimed in claim 24, wherein each uncertainty ellipse is represented by information expressing the length of the major and minor axes of the uncertainty ellipse and the orientation of at least one of the major and minor axes according to the predetermined coordinate system.

28. A method as claimed in claim 24, wherein the steps of the method are performed at a radio receiver arranged to move among the plurality of radio receiver positions so as to receive said signals from the radio transmitter at the plurality of radio receiver positions.

29. A method as claimed in claim 28, wherein the radio receiver is configured to determine its position and its position uncertainty as an uncertainty ellipse having major and minor axes.

30. A method as claimed in claim 29, wherein the radio receiver is configured to determine its position and its position uncertainty by means of a GPS receiver.

31. A method as claimed in claim 28, wherein the radio transmitter is a Wi-Fi access point and the radio receiver is a scanning vehicle supporting a Wi-Fi receiver and a GPS receiver.

32. A method as claimed in claim 24, wherein a respective radio receiver is provided at each of the plurality of radio receiver positions so as to collectively receive said signals from the radio transmitter at the respective radio receiver positions.

33. A method as claimed in claim 32, wherein the radio receivers are configured to exchange their respective receiver position weighting values so as to allow one or more of the radio receivers to form the estimate of the two-dimensional position of the radio transmitter.

34. A method as claimed in claim 32, wherein the estimate of the two-dimensional position of the radio transmitter is formed at a calculation server having access to the radio receiver positions and uncertainties and coupled to the plurality of radio receivers and configured to receive the respective receiver position weighting values.

35. A method as claimed in claim 24, wherein each scaling value used in the step of scaling the uncertainty vectors of the plurality of radio receivers is further dependent on a measure of the anisotropy of the respective uncertainty ellipse.

36. A method as claimed in claim 24, wherein each scaling value is further dependent on a measure of the length of the minor axis of the respective uncertainty ellipse relative to a first predetermined length such that each scaling value varies from a value of zero when the length of the respective minor axis is equal to the first predetermined length up to a maximum value when the length of the respective minor axis is zero.

37. A method as claimed in claim 24, wherein the step of forming each first and second coordinate axis weighting value from the receiver position weighting values is performed such that each first and second coordinate axis weighting values is given by the respective receiver position weighting value scaled by a factor that ranges from a predetermined minimum value when the total uncertainty along the first and second coordinate axes is at least a second predetermined length up to a maximum value when the total uncertainty along the respective first and second coordinate axis is zero.

38. A method as claimed in claim 24, wherein each uncertainty ellipse is defined with respect to the predetermined coordinate system.

39. A method as claimed in claim 24, wherein the first coordinate axis is represented by a normalised vector coincident with the rotated total vector and the second coordinate axis is represented by a normalised vector orthogonal to the rotated total vector.

40. A method as claimed in claim 24, wherein each uncertainty vector describing the orientation of a respective uncertainty ellipse is a unit vector defining the direction of the major or minor axis of that uncertainty ellipse in the predetermined coordinate system.

41. A method as claimed in claim 24, wherein each receiver position weighting value is formed in dependence on a signal strength of the respective signal received at the respective radio receiver position from the radio transmitter, each receiver position weighting value being greater for a greater received signal strength.

42. A method as claimed in claim 24, wherein the step of summing the projected components of each of the respective major and minor axes so as to form a total uncertainty along each of the first and second coordinate axes is performed such that the squares of the total uncertainty along the first and second axes is given by the sums of the squares of the respective projected components.

43. A method as claimed in claim 24, further comprising, for each of the first and second coordinate axes:
    calculating a correlated confidence estimate by means of a weighted centroid using the respective coordinate axis weighting values and the projected components of the major and minor axes of each uncertainty ellipse along that respective coordinate axis;
    calculating an uncorrelated confidence estimate by: forming for each uncertainty ellipse a product of the respective coordinate axis weighting value and a sum of the projected components along the respective coordinate axis of the major and minor axes of that uncertainty ellipse; summing over the set of uncertainty ellipses, respective squares of the products; and, dividing by the sum, over the set of uncertainty ellipses, of respective squares of the respective coordinate axis weighting values;
    forming a compound confidence estimate having a square that is a weighted combination of the uncorrelated confidence estimate and a square of the correlated confidence estimate; and
    using the compound confidence estimate as an estimate of uncertainty of the position of the radio transmitter due to the respective uncertanties in the position estimates of the plurality of radio receiver positions.

44. A method as claimed in claim 43, further comprising:
    forming an estimate of a weighting uncertainty in the position of the radio transmitter due to a mechanism by which the receiver position weighting values are formed and systematic errors due to the position of the radio transmitter being calculated by means of a weighted centroid; and combining the compound confidence estimate and the weighting uncertainty in quadrature so as to form an estimate of the total uncertainty in the estimated position of the radio transmitter.

45. A method as claimed in claim 24, wherein the predetermined coordinate system is one in which two-dimensional positions are expressed with respect to one of magnetic north or a geodetic coordinate system.

46. A radio receiver operable to estimate a position of a radio transmitter, the radio receiver being arranged to move among a plurality of radio receiver positions and being operable to determine its respective position uncertainty at each of the radio receiver positions as an uncertainty ellipse having major and minor axes, respective lengths and orientations of the major and minor axes defining the uncertainty ellipse, wherein the position uncertainties are stored in a memory, and the radio receiver comprising:

an antenna for receiving signals from the radio transmitter;

a weighting determination unit configured to process the stored radio receiver positions and uncertainties and to form, in dependence on signals received from the radio transmitter at the respective radio receiver positions, respective radio receiver position weighting values, each radio receiver position weighting value being inversely proportional to a measure of distance between the radio transmitter and a respective one of the plurality of radio receiver positions; and a position calculation unit configured to estimate the position of the radio transmitter by:

for each of the plurality of radio receiver positions, scaling an uncertainty vector associated with the respective position uncertainty, the uncertainty vector having an argument describing an orientation of the respective uncertainty ellipse in a predetermined coordinate system, defined relative to the major and minor axes of the uncertainty ellipse, by a scaling value, wherein the scaling value is proportional to the respective radio receiver position weighting value, and rotating the scaled uncertainty vector by multiplying its argument by a factor of four, wherein the argument of the uncertainty vector represents an angle that the uncertainty vector makes relative to a predetermined direction in the predetermined coordinate system;

summing the scaled vectors of the plurality of radio receiver positions so as to form a total vector;

dividing the argument of the total vector by a factor of four and using the resulting rotated total vector to define a compound coordinate basis comprising first and second coordinate axes; and forming the estimate of the two-dimensional position of the radio transmitter in the compound coordinate basis by;

projecting the major and minor axes of the uncertainty ellipse of each of the respective radio receiver positions onto the first and second coordinate axes so as to form a set of projected components for each of the major and minor aces of each of the uncertainty ellipses;

summing the projected components of each of the major and minor axes of each of the uncertainty ellipses, respectively, so as to form a total uncertainty along each of the first and second coordinate axes;

for each uncertainty ellipse, forming first and second coordinate axis weighting values from the respective radio receiver position weighting values scaled such that each of the first and second coordinate axis weighting values for each uncertainty ellipse decreases as the total uncertainty along the first and second coordinate axis increases; and calculating the position of the radio transmitter by computing a weighted centroid using the first and second coordinate axis weighting values and the radio receiver positions expressed in the compound coordinate basis.

* * * * *

UNITED STATES PATENT AND TRADEMARK OFFICE
CERTIFICATE OF CORRECTION

PATENT NO.      : 8,994,590 B2
APPLICATION NO. : 13/249948
DATED           : March 31, 2015
INVENTOR(S)     : Jarvis et al.

It is certified that error appears in the above-identified patent and that said Letters Patent is hereby corrected as shown below:

In the Specification

Column 11, Line 57, delete "vector $n_i$" and insert -- vector $\underline{n}_i$ --, therefor.

Column 11, Line 66, delete "vector K" and insert -- vector $\underline{K}$ --, therefor.

Column 12, Line 4, delete "K will" and insert -- $\underline{K}$ will --, therefor.

Column 12, Line 6, delete "vector K" and insert -- vector $\underline{K}$ --, therefor.

Column 12, Line 22, delete "arg(K) is the angle the vector K" and insert -- arg($\underline{K}$) is the angle the vector $\underline{K}$ --, therefor.

Column 13, Line 2, delete "the u, v" and insert -- the $\underline{u}$, $\underline{v}$ --, therefor.

Column 13, Line 24, delete "position Δu" and insert -- position Δ$\underline{u}$ --, therefor.

Column 13, Line 26, delete "new u, v" and insert -- new $\underline{u}$, $\underline{v}$ --, therefor.

Column 13, Line 28, delete "positions $Δu_i$" and insert -- positions $Δ\underline{u}_i$ --, therefor.

Column 13, Line 29, delete "new u, v" and insert -- new $\underline{u}$, $\underline{v}$ --, therefor.

Column 13, Line 37, delete "position Δu" and insert -- position Δ$\underline{u}$ --, therefor.

Column 13, Line 42, delete "the u, v" and insert -- the $\underline{u}$, $\underline{v}$ --, therefor.

Column 13, Line 52, delete "axis u." and insert -- axis $\underline{u}$. --, therefor.

Signed and Sealed this
Twenty-ninth Day of September, 2015

Michelle K. Lee
*Director of the United States Patent and Trademark Office*

CERTIFICATE OF CORRECTION (continued)
U.S. Pat. No. 8,994,590 B2

Column 13, Line 54, delete "$\alpha_u = \Sigma u_{i,u} w_{i,u})^2 / (\Sigma w_{i,u})^2$" and insert -- $\alpha_u = \sum u_{l,u} w_{l,u} / \sum w_{l,u}$ --, therefor.

Column 14, Line 51, delete "the u, v" and insert -- the u, v --, therefor.

Column 16, Line 27, delete "basis u, v" and insert -- basis u, v --, therefor.

Column 16, Line 45, delete "new u, v" and insert -- new u, v --, therefor.

Column 16, Line 61, delete "position Δu" and insert -- position Δu --, therefor.

Column 16, Line 62, delete "new u, v" and insert -- new u, v --, therefor.

Column 16, Line 65, delete "positions Δu_i in the new u, v" and insert -- positions Δu_i in the new u, v --, therefor.

Column 16, Line 66, delete "position Δu" and insert -- position Δu --, therefor.

Column 17, Line 4, delete "the u, v" and insert -- the u, v --, therefor.

Column 17, Line 9, delete "axis u" and insert -- axis u --, therefor.

Column 17, Line 50, delete "for the u" and insert -- for the u --, therefor.

Column 17, Line 58, delete "the u, v" and insert -- the u, v --, therefor.

In the Claims

Column 19, Line 44, Claim 5, delete "claim 1" and insert -- claim 1, --, therefor.

Column 20, Line 31, Claim 16, delete "claim 1." and insert -- claim 1, --, therefor.

Column 23, Line 43, Claim 32, delete "claim 24." and insert -- claim 24, --, therefor.

Column 23, Line 63, Claim 36, delete "claim 24." and insert -- claim 24, --, therefor.

Column 24, Line 4, Claim 37, delete "claim 24." and insert -- claim 24, --, therefor.

Column 24, Line 14, Claim 38, delete "claim 24." and insert -- claim 24, --, therefor.

Column 24, Line 17, Claim 39, delete "claim 24." and insert -- claim 24, --, therefor.

CERTIFICATE OF CORRECTION (continued)
U.S. Pat. No. 8,994,590 B2

Column 24, Line 22, Claim 40, delete "claim 24." and insert -- claim 24, --, therefor.

Column 24, Line 27, Claim 41, delete "claim 24." and insert -- claim 24, --, therefor.

Column 24, Line 33, Claim 42, delete "claim 24." and insert -- claim 24, --, therefor.

Column 24, Line 40, Claim 43, delete "claim 24." and insert -- claim 24, --, therefor.

Column 24, Line 63, Claim 43, delete "uncertanties" and insert -- uncertainties --, therefor.

Column 26, Line 22, Claim 46, delete "minor aces" and insert -- minor axes --, therefor.